US012710404B2

(12) United States Patent
Kökova et al.

(10) Patent No.: US 12,710,404 B2
(45) Date of Patent: Aug. 18, 2026

(54) ELECTRON CAPTURE DETECTOR OPERATING WITH A SCINTILLATION CRYSTAL

(71) Applicant: FOX ROBOTICS LABORATUVAR TEKNOLOJİ HİZMETLERİ SANAYİ LİMİTED ŞİRKETİ, Pendik (TR)

(72) Inventors: Bora Kökova, Pendik (TR); Muhammed Tevfik Kaplanoğlu, Pendik (TR)

(73) Assignee: FOX ROBOTICS LABORATUVAR TEKNOLOJI HIZMETLERI SANAYI LIMITED SIRKETI, Pendik (TR)

(*) Notice: Subject to any disclaimer, the term of this patent is extended or adjusted under 35 U.S.C. 154(b) by 153 days.

(21) Appl. No.: 18/714,527

(22) PCT Filed: Dec. 31, 2021

(86) PCT No.: PCT/TR2021/051665

§ 371 (c)(1),
(2) Date: May 29, 2024

(87) PCT Pub. No.: WO2023/101628

PCT Pub. Date: Jun. 8, 2023

(65) Prior Publication Data

US 2025/0020620 A1 Jan. 16, 2025

(51) Int. Cl.
*G01N 30/70* (2006.01)
*G01N 30/02* (2006.01)
(Continued)

(52) U.S. Cl.
CPC ............ *G01N 30/70* (2013.01); *G01N 30/74* (2013.01); *G01N 2030/025* (2013.01); *G01N 2030/77* (2013.01)

(58) Field of Classification Search
None
See application file for complete search history.

(56) References Cited

U.S. PATENT DOCUMENTS 5,242,471 A 9/1993 Markham et al.
7,013,707 B2 * 3/2006 Prohaska ............... G01N 30/64 422/89
(Continued)

FOREIGN PATENT DOCUMENTS

GB 2379010 A 2/2003
JP 2012198238 A 10/2012

OTHER PUBLICATIONS

International Search Report and Written Opinion for PCT Application No. PCT/TR2021/051665 mailed Apr. 19, 2023.

*Primary Examiner* — Richard Isla
(74) *Attorney, Agent, or Firm* — Wood, Phillips, Katz, Clark & Mortimer

(57) ABSTRACT

A detector for use with a gas chromatography device includes a column input for receiving a sample, a gas inlet for introducing a carrier gas, and a gas mixing area for mixing the sample with the carrier gas. A measurement chamber is in fluid communication with the gas mixing area and includes a gas inlet line and a gas outlet line. A scintillator crystal is positioned to interact with the mixed gases and to emit photons to generate an optical signal. A photodetector receives the optical signal and generates a corresponding electrical signal. The scintillator crystal may have an uncoated or conductive-coated outer surface. A fixing apparatus supports the scintillator crystal and/or photodetector and transmits the electrical signal to a data output line.

5 Claims, 4 Drawing Sheets

(51) Int. Cl.
*G01N 30/74* (2006.01)
*G01N 30/00* (2006.01)

(56) References Cited

U.S. PATENT DOCUMENTS

| | | | | |
|---|---|---|---|---|
| 7,847,936 | B2 * | 12/2010 | Jarrell | G01N 30/74<br>356/343 |
| 12,416,609 | B1 * | 9/2025 | Henderson | G01N 30/34 |
| 2017/0168031 | A1 * | 6/2017 | Verenchikov | H01J 49/147 |

* cited by examiner

ELECTRON CAPTURE DETECTOR OPERATING WITH A SCINTILLATION CRYSTAL

TECHNICAL FIELD

The invention relates to an electron capture detector (ECD) operating with a scintillation crystal.

PRIOR ART

The gas chromatography (GC) systems which are one of the preferred methods for the separation of the organic compounds, are in the state of the art. The electron capture detectors (ECD), the detectors often used in the gas chromatography systems, provide high resolution results in the detection of halogens, organochlorine pesticides, herbicides and polycarbonate components.

In the ECDs, the radioactive ionization sources are generally used. The most common one of these sources is $^{63}$Ni isotope in the form of a thin plate (foil), and said source is also disclosed in the patent documents U.S. Pat. Nos. 4,063,156 or 5,760,291. Apart from these, it is also known that the ECDs have been developed, which do not contain radioactive sources and are described in U.S. Pat. Nos. 6,531,877 B1 or 8,188,442 B2 patent documents. Therefore, in the ECD measurements the electrons released by the decay of the cylindrical $^{63}$Ni isotope, which is used as a source generally fall on an anode placed in the center of the source, and the current formed by the mobility of the electrons receiving the energy is measured by various electronic circuits such as signal amplifiers. In this way, the sample from the gas chromatography enters as a gas between the radioactive source and the anode, and the characteristic properties of the gas may be calculated with various interactions.

The unstable $^{63}$Ni isotope, which has a half-life of 100.1 years, transforms into the $^{63}$Cu isotope by dissolution, while emitting the free electrons at different energies up to a maximum energy of 66.980 keV. The free electron loses energy and hits the anode depending on the density and the characteristics of the gas with which it interacts along the distance traveled between the radioactive source and the anode. If the gas in the line which was traveled in the course of the event is of relatively high density, a low current is measured on the anode, and if it is of a low density, a high current is measured thereon. Thus, a graph termed chromatogram is obtained by creating a flow/time graph based on the flow measured by the incoming gas which flows in a certain order depending on the retention time in the column coupled to the gas chromatography.

In the state of the art, an ECD structure is schematically included in the U.S. Pat. No. 5,760,291 patent. Although said detector is ECD, the scintillator crystal is not used in this detector structure.

On the other hand, the anode used in the current ECDs is produced from the conductive materials such as copper and brass. As it is known, it is not possible to distinguish the energies of each of the incoming particles in these materials. Instead of the electrical signal generated by each of the particles, the cumulative electrical current generated by them is measured with a metal anode.

In the state of the art, it is necessary to develop mechanisms that make the above disadvantages advantages.

SUMMARY OF THE INVENTION

The object of the invention is to develop an electron capture detector (ECD) comprising a scintillator crystal and to use said detector in a chromatography method.

In one embodiment of the invention, the scintillator crystal is covered with gold, which is a highly conductive material, or any other material which has a greater conductivity. Data can be collected with this application from the coating itself, apart from the scintillator crystal. In the present technique, instead of a copper and brass anode, a scintillator crystal is used in the invention to function as an anode.

In contrast to the present technique, in the use of the scintillator, the energy of each incoming particle is obtained independently, provided that the scintillator is less active than the luminescence decay time and is below the sampling rate, and the chromatogram data is generated by a spectral analysis. In this way, cumulative data tracking can be made with the use of a scintillator, as well as the energy of each particle is obtained independently, and it is characteristically calculated from the obtained data that with which types of the atoms the electron interacts. This characteristic data is provided both by the energy which is lost by the striking electron along the way, and by the characteristic photon which is released based on the excitation energy of the atom with which it interacts. Thus, the use of a scintillator is advantageous over the use of metal anodes.

DESCRIPTION OF THE REFERENCES IN THE DRAWINGS

Figure 1:
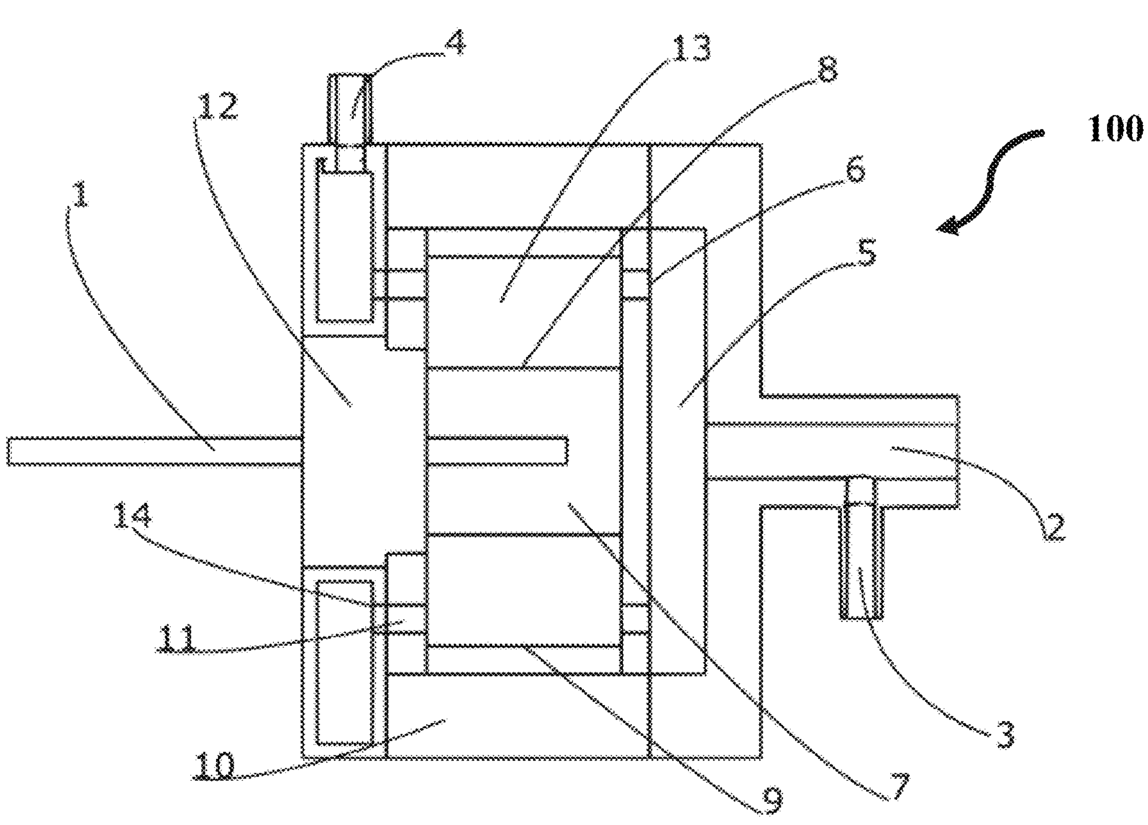
FIG. 1 is a view of a cross-section of the detector of the invention.
Figure 2:
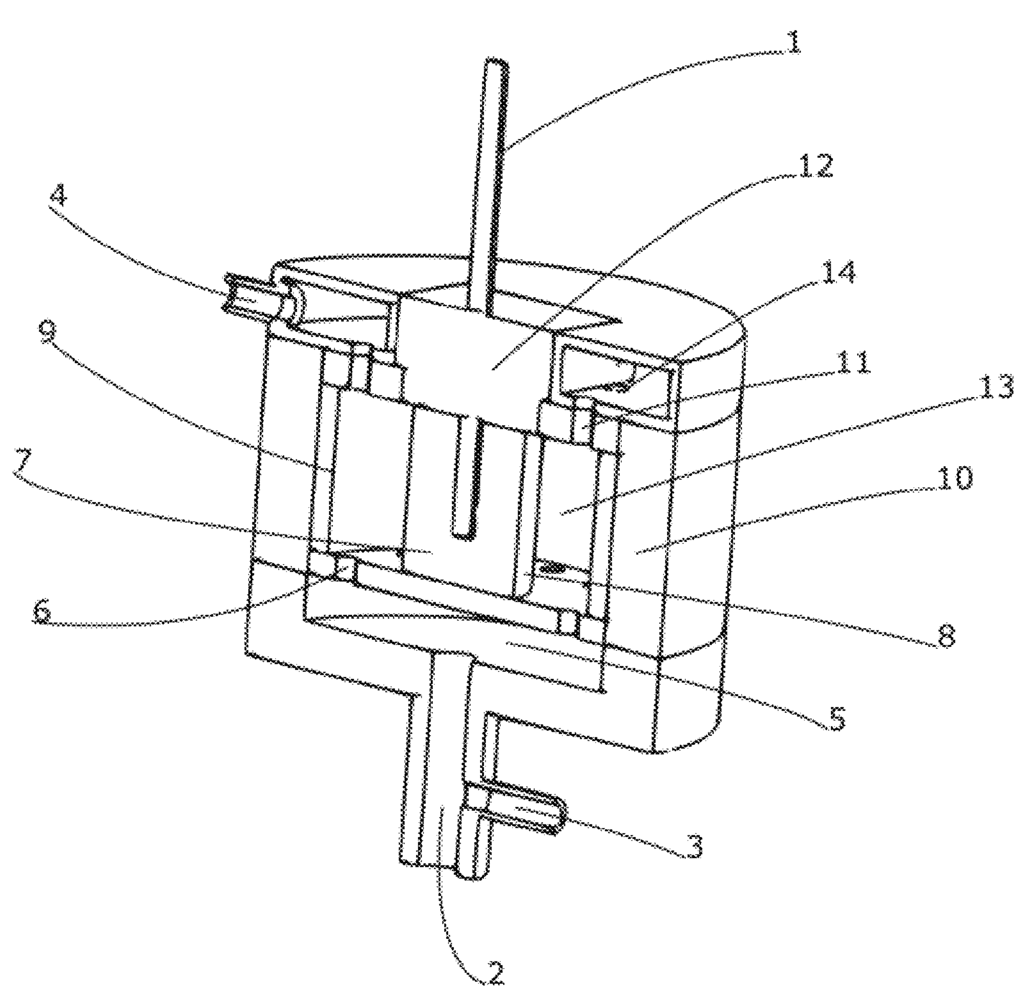
FIG. 2 is a perspective side view of a cross section of the detector of the invention.
Figure 3:
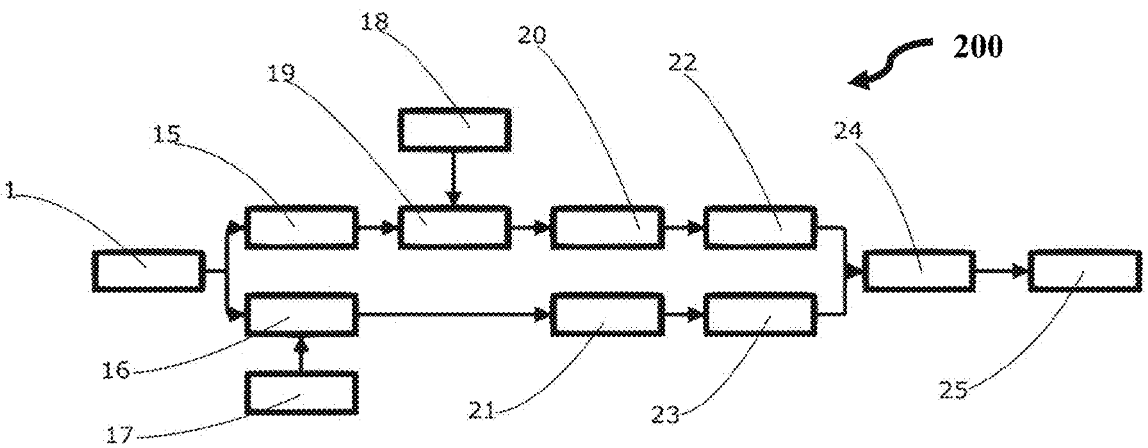
FIG. 3 is a block diagram representing the conversion of an analog signal produced in the detector to a digital signal.

The numbers in the drawings are provided below in order to provide a better understanding of the invention:

100 Detector
- 1. Data output line
- 2. Column input
- 3. Gas inlet
- 4. Gas outlet
- 5. Gas mixing area
- 6. Gas inlet line
- 7. Scintillator crystal
- 8. Coating
- 9. Source
- 10. Shielding material
- 11. Gas outlet line
- 12. Fixing apparatus
- 13. Measurement chamber
- 14. Outlet chamber

200 Electronic Mechanism
- 15. First unit
- 16. Second unit
- 17. First power source
- 18. Second power source
- 19. Photodetector
- 20. Optical signal processing unit
- 21. Electrical signal unit 22. Optical signal amplifier
23. Electrical signal amplifier
24. Analog to digital converter
25. Electronic circuit

DETAILED DESCRIPTION OF THE INVENTION

In one embodiment of the invention, the detector (100) of the invention comprises at least one data output line (1) in connection with an electronic mechanism (200), at least one column input (2), which is connected to the detector outlet column of a gas chromatography device and to which a sample from which the chromatography data is to be obtained is sent, at least one gas inlet (3) so that preferably nitrogen gas can enter, at least one gas outlet (4) for a gas to exit from the detector (100), at least one gas mixing area (5) for mixing the gas sent from the column inlet (2) and preferably $N_2$ gas sent from the gas inlet (3), at least one radioactive measurement chamber (13), at least one gas inlet line (6) for transferring the gas to said radioactive measurement chamber (13), at least one light emitting source (9), preferably at least one shielding material (10) that prevents gases from exiting the shielding area, at least one gas outlet line (11) for the gas to exit from said radioactive measurement chamber (13), at least one scintillator crystal (7), over which the electrons pass and the photons which are released from the interaction hit and which ensures the formation of light signals at visible wavelengths and ultraviolet (UV) wavelengths, at least one fixing apparatus (12) that carries the data of the light coming from the fiber optic cable inside the scintillator crystal (7) using a photodetector placed on the surface thereof, fixes the scintillator crystal (7) and transfers the electrical data from the scintillator crystal (7) to the data output line (1), and preferably at least one outlet chamber (14) to allow the gas to exit. In another embodiment of the invention, a non-radioactive source (9) is used in the detector (100) of the invention instead of the radioactive source (9). In this case, the chromatogram data is obtained by changing the geometric form of the measurement chamber (13).

Preferably, the electrical signal in the photodetector unit, which will read the light on the scintillator crystal (7) is formed by the current applied by a first power source (17) due to the optical photons falling on the photodetector. In addition, the scintillator crystal (7) interacts with the gases which are mixed in the said measurement chamber (13), and also allows the formation of an optical signal by emitting photons which has specific emission wavelengths as a result of the gases with which it interacts and of the current applied to the photodetector unit, or without the application of any current. Thus, both electrical and optical signals are generated.

In one embodiment, the outer surface of the scintillator crystal (7) may be uncoated. In another embodiment, the outer surface of the scintillator crystal (7) is coated with a conductive coating (8) which has a predetermined thickness. In said embodiment, in addition to the optical signal, the electrical signal is also obtained over the conductor, wherein the corrosion which will occur on the scintillator crystal (7) is prevented and the signal of low energy electrons is separated from the optical signal.

The gas chromatography device to be used in the invention comprises the detector (100) of the invention and at least one electronic mechanism (200) which processes the optical/electrical signals coming from said detector and forms the spectrum thereof.

In another embodiment of the invention, the detector (100) of the invention comprises at least one data output line (1) in connection with an electronic mechanism (200), at least one column input (2), which is connected to the detector outlet column of a gas chromatography device and to which the gas to be measured is sent, at least one gas inlet (3) so that preferably nitrogen gas can enter, at least one gas outlet (4) for gas to exit from the detector (100), at least one gas mixing area (5) for mixing the gas sent from the column inlet (2) and preferably $N_2$ gas sent from the gas inlet (3), at least one radioactive measurement chamber (13), at least one gas inlet line (6) for transferring the gas to said radioactive measurement chamber (13), at least one source (9), at least one shielding material (10) that prevents the gas from exiting the radioactive area, at least one gas outlet line (11) for the gas to exit from said radioactive measurement chamber (13), at least one scintillator crystal (7), over which the electrons pass and the photons which are released from the interaction hit and which ensures the formation of light signals at visible wavelengths and ultraviolet wavelengths, a conductive coating (8) of the predetermined thickness which is coated onto the scintillator crystal, at least one fixing apparatus (12) that carries the data of the light coming from the fiber optic cable inside the said coating (8), fixes the scintillator crystal (7) and transfers the electrical data coming from the coating (8) to the data output line (1), and at least one outlet chamber (14) to allow the gas to exit.

The gas supplied to the gas inlet (3) is preferably $N_2$ gas, however it is not limited thereto in practice.

In one embodiment of the invention, the scintillator (or scintillation) crystal (7) is used in the detector (100) of the invention without any coating. In said embodiment, the scintillator crystals (7) may be YAP(Ce) or YAG(Ce) or LYSO or CdWO4 and NaI(TI) or $CaF_2$. However, it is not limited to these materials and different scintillation materials can be used. In another embodiment of the invention, the scintillator (or scintillation) crystal (7) comprises a conductive coating (8) which has a high conductivity at a predetermined thickness value. Said conductive coating (8) is metals with a high conductivity, such as gold, platinum, silver, but in practice it is not limited thereto. The above-mentioned conductive coating (100) has preferably a thickness of 100 nm. The spectrum obtained is a characteristic feature caused by the internal structure of the scintillator. The spectral data obtained in the invention is made less noisy/is improved by using the coating (8) on the scintillator crystal (7).

In order to measure the data in the detector (100) of the invention, an electronic mechanism (200) is used, which is coupled to an output line (1). Said electronic mechanism (200) comprises at least one first unit (15) for carrying the light coming through the scintillator crystal (7) over the fiber optic cable or directly processing it without a fiber optic, at least one second unit (16) receiving the electrical data coming through the conductor on which the scintillator crystal (7) is coated or directly through the scintillator crystal (7), at least one first power source (17) applying (or electrically feeding) a current to the second unit (16), thereby to the coating, at least one photodetector (19) which converts the light data into the electrical signal, at least one second power supply (18) used to display the optical data in a photodetector, preferably in a photomultiplier (PMT), at least one optical signal processing unit (20), where said photomultiplier (19) signal is amplified, at least one electrical signal unit (21) which amplifies the electrical signal coming through the conductive coating (8), at least one optical signal amplifier (22) for the signal from said photomultiplier (19), at least one electrical signal amplifier (23) for the signal from the conductive coating (8), at least one high-speed analog-to-digital converter (24) with separate input for both signals (optical and electrical), and at least one electronic circuit (25) for collecting the data.

Said column inlet (2) is connected to the detector outlet column of a gas chromatography device, and the gas flows from the gas inlet (3) together with the gas flowing from the column. The gas which will flow from the gas inlet (3) can be nitrogen or another preferred gas. The gas flowing from the column inlet (2) and from the gas inlet (3) flows to the gas mixing area (5) by mixing. In the gas mixing area (5), the pressures of the gases mix depending on the ambient temperature, and the entry is realized through the channels indicated by the gas inlet line (6) to the chamber indicated by the measurement chamber (13) in which the radioactive area is concentrated. The gases are prevented from leaving the radioactive area thanks to the shielding material (10).

The electron particles are randomly emitted from the surface indicated by the position indicated by the source (9). The free particles first interact with the conductive coating (8) and generate an electrical signal. The gain obtained from the electrons trapped on the conductive coating (8) can be adjusted according to the voltage applied from the power source (17) to the conductive coating (8) or directly to the scintillator crystal (7). The electrons passing through the conductive coating (8) and the photons released from the interaction of said electrons and the gas hit the scintillator crystal (7) and form the light signals in visible and ultraviolet wavelengths on the scintillator crystal (7).

The electric current formed in the conductive coating (8) and the luminescence level formed in the scintillator crystal (7) change in proportion to the energy lost by the particles coming from the source (9) due to the gas which they encounter in the measurement chamber (13).

The incoming gas flows to the outlet chamber (14) through the channels indicated by the gas outlet line (11), and then the gas is discharged by leaving this chamber from the gas outlet (4).

The data obtained from the conductive coating (8) and/or the scintillator crystal (7) starts to be processed to be directed to the electronic mechanism (200), which is the data acquisition system, through the data output line (1). It proceeds as a fiber with the first unit (15) and is connected to the photomultiplier (19). The photomultiplier (19) is controlled by the second power source (18), and the light signal is converted into the electrical signal and proceeds to the optical signal unit (20). The data output line (1) the gain of which is controlled by the first power source (17) and the electrical signal coming from the coating (8) proceed to the electrical signal unit (21). A pre-amplification process for both signals which come as the electric current in the optical signal unit (20) and the electrical signal unit (21) is performed, and they are directed to the optical signal amplifier (22) and the electrical signal amplifier (23). In order to convert both signals from analog to digital, an amplification is performed in the optical signal amplifier (22) and the electrical signal amplifier (23). The signals proceed to the analog-to-digital converter (24). In the analog-to-digital converter (24), both signals are analyzed separately and converted into a digital signal, and the digital signal generation process is completed in the electronic circuit (25) to form the chromatogram data. Therefore, the optical and electrical signal coming from the detector (100) is amplified/filtered by said electronic mechanism (200), and the spectrum thereof is obtained.

It has been made possible to use the ECD system with the scintillation method thanks to the scintillator crystal (7) which is used in the invention. The use of the scintillation technique in the ECD method allows a measure which is more sensitive than the conventional methods in the gas analysis. The use of the scintillation technique also allows the use of the different radioactive sources in the gas chromatography instead of the $Ni^{63}$ source which is generally used.

The corrosion which would be formed by the gas measured in the gas chromatography will be reduced by the conductive coating (8). Since the coating (8) consists of a highly conductive material, it can be used as a second data source.

The anode which is made of the materials such as copper and brass in the state of the art is converted (or evolved) into the scintillator crystal (8). Once the detector (100) of the invention herein begins to be used in a gas chromatography, the scintillator crystal (7) contained therein is coated with a conductive material depending on the content of the gases passing there through, as there may be corrosion, pollution, contamination and the reduced accuracy and the precision of the data. However, when the scintillator crystal (7) is coated with materials such as gold, etc., some data acquisition advantages can be achieved, and accordingly, the obtained spectra can be better.

Figure 4:
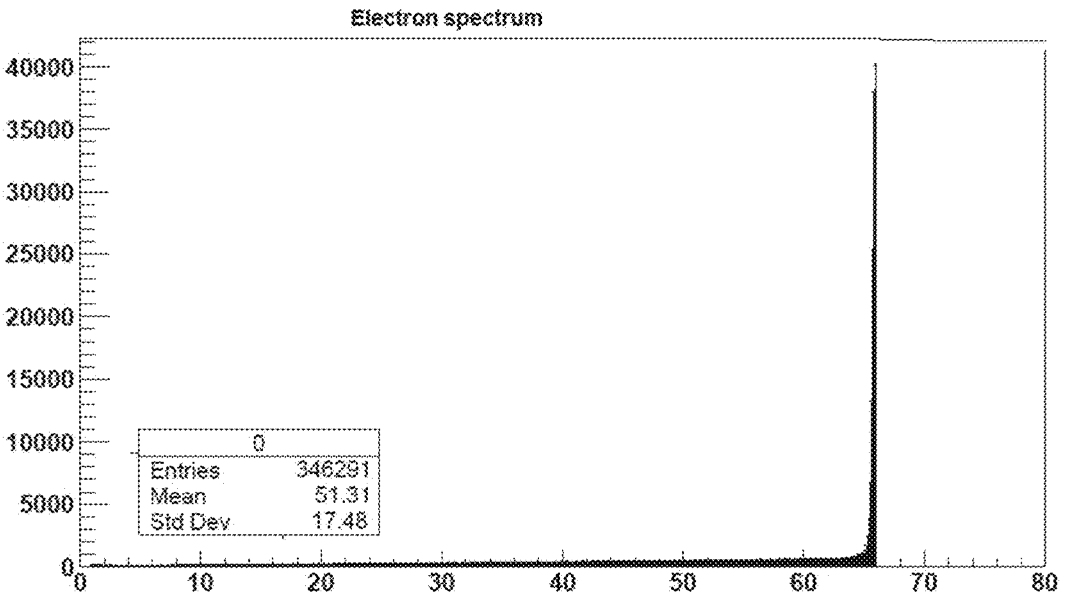
FIG. 4 is the graph of the spectral distributions of the energies of the electrons striking the scintillator crystal coated with 100 nm gold plating.
Figure 5:
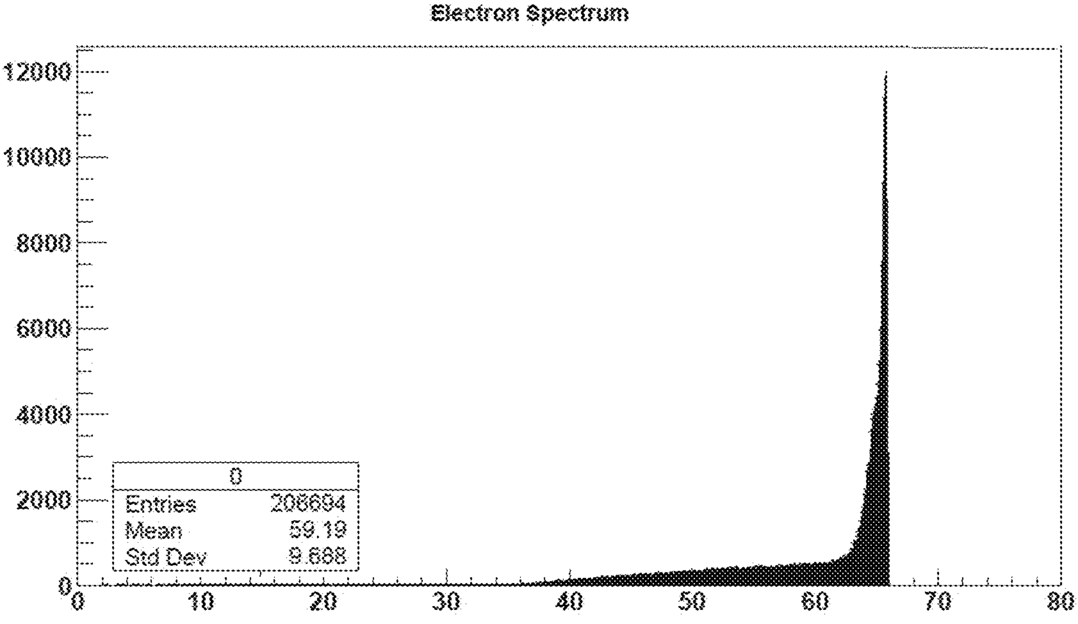
FIG. 5 is a graph of the spectral distributions of the energies of the electrons striking the uncoated scintillator crystal.

In the graphs given in FIG. 4 and FIG. 5, the situation between the scintillator crystal (7) coated with 100 nm gold coating such that there is air in the gas chamber and the uncoated scintillator crystal (7) is displayed, and the spectral distributions of the energies of the electrons striking the scintillator crystal (7) are shown in the both graphs. In both simulations, the situation created by the electrons with an output energy of 66 keV at 1 MBq activity in the same geometric system for a period of one second was examined.

346.291 of the 1.000.000 electrons formed in the graph in FIG. 4 directly reached the scintillator crystal (7), and an average of 51.32 keV energy was measured (including the electrons striking at low energies). In the graph in FIG. 5, 100 nm gold coating (8) was applied to the scintillator crystal (7), and it was observed that 206.694 electrons hit the scintillator crystal (7). Despite that there is approximately 40% less of electron strike compared to the simulation in FIG. 4, the average value (59.19 keV) closer to the output energy of the electrons was observed in the energy information. The reason for the difference is that low energy electrons are trapped within the gold coating (8). In this way, it is seen that the low-energy electrons are filtered out at the measured average electron energy for the same medium. This filtering can also be examined as the decrease in the number of data with the gold coating (8) for values less than 30 keV (average) on the x-axis of the graphs. Briefly, the information that the low energy electrons will be blocked with 100 nm gold coating (8) and a decrease in the parasitic signal formation will be observed is simulated in the graphics.

INDUSTRIAL APPLICABILITY OF THE INVENTION

The invention is a detector (100) which comprises a scintillator crystal (8) to enable precise measurements to be made in the gas chromatography that can be used in the industry and which is industrially applicable.

The invention is not limited to the above exemplary embodiments, and a person skilled in the art can easily reveal the different embodiments of the invention. These should be considered within the scope of protection of the invention claimed in the claims.

The invention claimed is:

1. A detector, comprising:

at least one data output line connected to an electronic mechanism;

at least one column input connected to a detector outlet column of a gas chromatography device configured to receive a sample from which the gas chromatography data is obtained;

at least one gas inlet configured to receive nitrogen gas;

at least one gas outlet configured to evacuate gas from the detector;

at least one gas mixing area for mixing gas received by the at least one column input from the detector outlet column, and configured to mix nitrogen gas received from the at least one gas inlet;

at least one radioactive measurement chamber;

at least one gas inlet line for transferring gas from the at least one gas mixing area, to said at least one radioactive measurement chamber;

at least one radioactive or non-radioactive light emitting source;

at least one shielding material that prevents gases from exiting at least one shielding area;

at least one gas outlet line for gas to exit from said at least one radioactive measurement chamber;

at least one outlet chamber configured to evacuate gas from the at least one gas outlet line;

a first power source;

a photodetector unit;

wherein the detector further comprises at least one scintillator crystal, configured to receive a current applied by the first power source and which interacts with mixed gases in the at least one radioactive measurement chamber, wherein the at least one scintillator crystal allows the formation of an optical signal by emitting photons which have specific emission wavelengths as the photons interact with the gases and as a result of current applied to the photodetector unit or without the application of current;

wherein the at least one scintillator crystal either has an uncoated outer surface, or has an outer surface coated with a conductive coating, wherein the outer surface has a predetermined thickness for obtaining the electrical signal formed on the surface of the at least one scintillator crystal, as well as an optical signal; wherein the outer surface prevents corrosion that would occur thereon and separates low energy electrons from the optical signal;

at least one fixing apparatus that carries data from the optical signal coming from a fiber optic cable inside said at least one scintillator crystal, or the data from the optical signal detected with said photodetector placed on the surface of the at least one scintillator crystal, and fixed to the scintillator crystal, and transfers the electrical data from the scintillator crystal to the data output line.

2. The detector according to claim 1, wherein the detector comprises YAP(Ce) or YAG(Ce) or LYSO or CdWO4 and NaI(TI) or $CaF_2$ scintillator crystals.

3. The detector according to claim 2, wherein the detector comprises a conductive coating, wherein the conductive coating is a metal with a high conductivity.

4. The detector according to claim 3, wherein the detector comprises a conductive coating which has a thickness of 100 nm.

5. The detector according to claim 3, wherein the metal with a high conductivity is selected from group consisting of gold, platinum, and silver.

* * * * *